United States Patent [19]

Keelan et al.

[11] Patent Number: 5,428,415
[45] Date of Patent: Jun. 27, 1995

[54] SLIDE PROJECTOR FOR FRONT AND REAR PROJECTION

[75] Inventors: Brian W. Keelan, Rochester; Daniel M. Pagano, South Henrietta; Lee R. Estelle, Rochester, all of N.Y.

[73] Assignee: Eastman Kodak Company, Rochester, N.Y.

[21] Appl. No.: 200,053

[22] Filed: Feb. 22, 1994

[51] Int. Cl.⁶ .................. G03B 21/10; G03B 21/28
[52] U.S. Cl. ............................ 353/71; 353/82; 353/95
[58] Field of Search ............ 353/71, 82, 95, 96, 353/76, 77, 21, 23, 68, 72, 73

[56] References Cited

U.S. PATENT DOCUMENTS

| | | |
|---|---|---|
| 221,573 | 11/1879 | Keevil . |
| 1,134,154 | 4/1915 | Patterson . |
| 1,400,958 | 12/1921 | Kelly . |
| 1,461,133 | 7/1923 | Marten . |
| 1,904,695 | 4/1933 | Plies . |
| 3,387,535 | 6/1968 | Bennett ........................... 353/71 |
| 3,447,869 | 6/1969 | Szymber ........................... 353/71 |
| 4,331,397 | 5/1982 | Jewison et al. ................... 353/71 |

FOREIGN PATENT DOCUMENTS 0281127 8/1988 European Pat. Off. .

*Primary Examiner*—William A. Cuchlinski, Jr.
*Assistant Examiner*—William C. Dowling
*Attorney, Agent, or Firm*—Heslin & Rothenberg; Wayne F. Reinke

[57] ABSTRACT

A slide projector for both front and rear projection includes a shallow lens tunnel for mounting a simple wide-angle lens. In a first aspect, a second lens port is added to a conventional slide projector designed for front projection. A mirror pivots to invert and direct light rays from an illuminated slide to the simple wide-angle lens. In a second aspect, only the shallow lens tunnel is present and a rotating slide gate orients the slide, depending on operation in front or rear projection mode. Front projection in the second aspect requires a lens tunnel extension.

9 Claims, 2 Drawing Sheets

SLIDE PROJECTOR FOR FRONT AND REAR PROJECTION

BACKGROUND OF THE INVENTION

1. Technical Field

The present invention generally relates to image projection. More particularly, the present invention relates to slide projection.

2. Background Art

Slide projectors in the past have been primarily designed for front projection onto a light-reflective screen with the slide projector located a distance from the screen either in the audience area or behind the audience. Front projection, however, can be troublesome and awkward. The projector itself can be a distraction to the audience. The room also needs to be darkened for optimum viewing and a person or object in front of the projector casts a shadow on the screen, making it difficult for a speaker to point to areas of or objects in the image on the screen.

Front slide projection has historically been more popular than rear projection, due to cost considerations stemming from slide projector design. However, rear projection, where the slide projector is behind a screen allowing light to pass through it front-to-back rather than reflecting light, offers significant advantages over front projection in many situations. These advantages include higher image quality, even in partially lit rooms often encountered in business meetings, the projector is out of view of the audience to avoid distraction and a speaker can approach the screen without casting a shadow.

The lenses used in rear projection have relatively short focal lengths, giving a wide-angle image, on the order of 25–50 mm, due to the close proximity to the screen. In contrast, the lenses used in front projection are of medium focal length (on the order of 85–105 mm) or long focal length (on the order of 150–180 mm). Since the majority of slide projectors in the past have been designed primarily for front projection, they include lens ports having a deep lens tunnels for mounting longer focal length lenses, the lens tunnels being on the order of 100–125 mm.

While a deep lens tunnel is optimal for front projection lenses with longer focal lengths, it imposes severe constraints on shorter focal length lenses. Essentially, a deep lens tunnel requires a wide-angle lens to include extra lens elements to "pipe" the light from the slide to the end of the tunnel, where the light rays may finally diverge in a cone. Complicated lens designs, such as reverse telephoto arrangements, are needed to effect this, adding both size and considerable cost to the lens. These types of lenses can cost 5–10 times more than conventional front projection lenses, making rear projection cost-prohibitive. Thus, conventional slide projectors can be used for rear projection using such complex and expensive lenses. However, unless the slides are oriented for rear projection, requiring that slides originally oriented for front projection be flipped 180° on a vertical axis, a mirror outside the projector is needed for inverting the final image. The mirror must be aligned properly with the screen and thus adds to the rear projection effort.

If some way could be found to eliminate the need for complicated rear projection lens designs, rear projection could become competitive in cost with front projection. However, front projection cannot be ignored in the process, since some facilities may only be set up for front projection (i.e., they may not have a rear projection screen). Many speakers have talks that they take on the road with prepared slide trays. Slides for rear projection need to be flipped 180 degrees on a vertical axis in the tray for rear projection in relation to front projection. This could be a cumbersome task for the speaker when some facilities will be set up for front projection only and others for rear projection only.

Thus, a need exists for an easy-to-use slide projector utilizing inexpensive rear projection lenses and also being capable of front projection, without having to flip the slides in the slide tray.

SUMMARY OF THE INVENTION

Briefly, the present invention satisfies the need for a slide projector for both front and rear projection, allowing for inexpensive rear projection lens design without having to flip slides by providing a slide projector with a shallow lens tunnel and means for orienting and directing the image to avoid flipping the slides.

The present invention provides a slide projector for front and rear projection. The slide projector includes a light source for illuminating a slide for projection. The invention comprises a rear projection lens port including a shallow lens tunnel for mounting a rear projection lens and means for orienting and directing light rays from the illuminated slide for rear projection from the rear projection lens. The orienting and directing means is internal to the slide projector.

In a first aspect of the invention, the orienting and directing means comprises means for selectively reflecting the light rays from the illuminated slide, which may be, for example, a mirror capable of pivotal movement.

In a second aspect of the invention, the orienting and directing means comprises means for orienting the slide, which may be, for example, a slide gate capable of pivotal movement.

These, and other objects, features and advantages of this invention will become apparent from the following detailed description of the various aspects of the invention taken in conjunction with the accompanying drawings.

BEST MODE FOR CARRYING OUT THE INVENTION

The present invention provides a slide projector for use in both front and rear projection. In both embodiments described hereinafter, the slide is brought closer to the lens through the introduction of a shallow lens tunnel, allowing for the use of simpler and cheaper lenses for rear projection than were previously possible.

Figure 1:
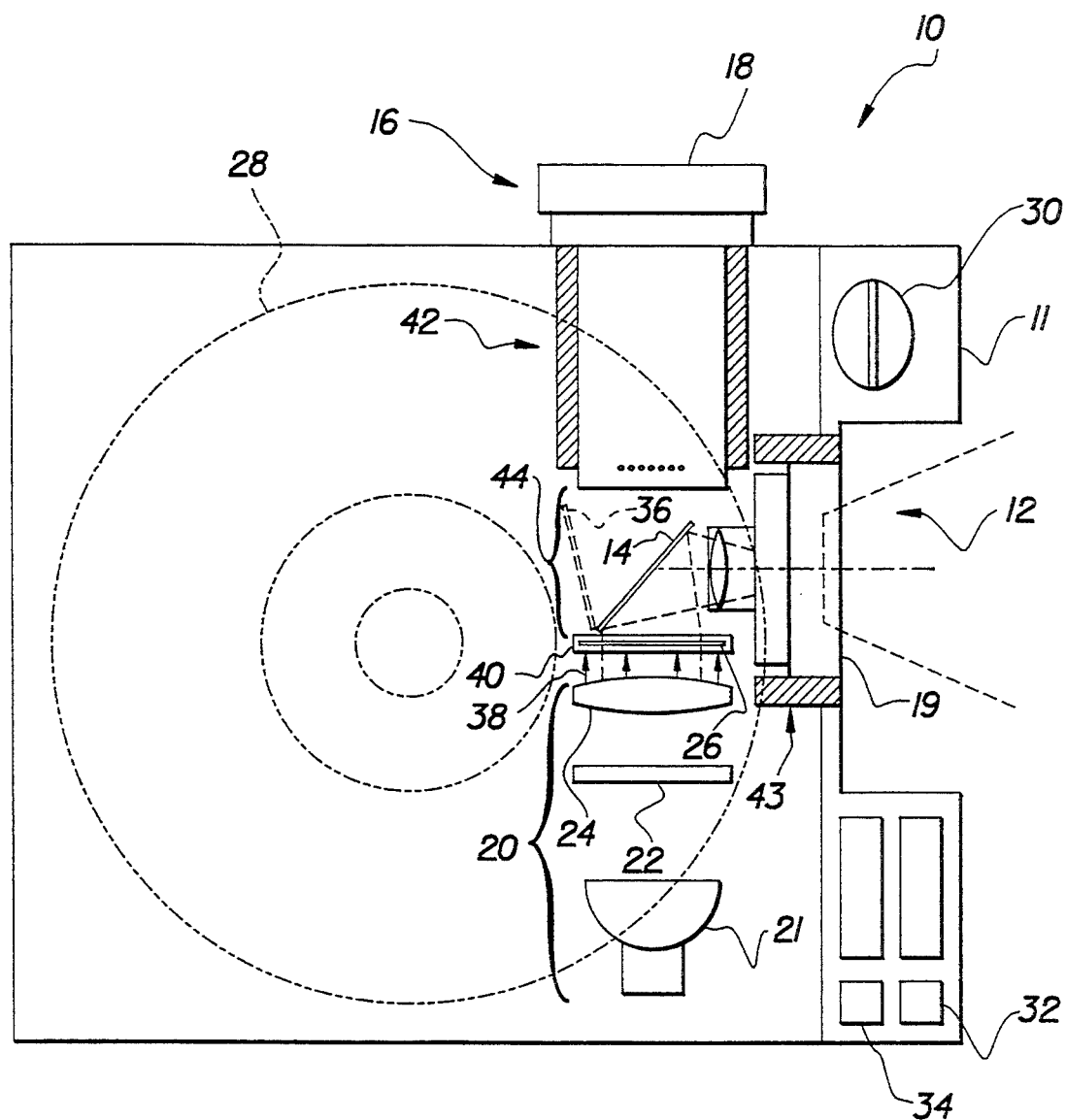
FIG. 1 is a top view of a slide projector according to the first aspect of the present invention.

FIG. 1 depicts a slide projector 10 according to a first aspect of the present invention. Slide projector 10 is basically a modified version of existing carousel-type slide projectors, with the addition of a rear projection lens port 12 having shallow lens tunnel 43, and pivoting mirror 14. Slide projector 10 also comprises housing 11; front projection lens port 16, into which front projection lens 18 has been mounted; rear projection lens 19;

light source 20, comprising light 21 and light collector elements 22 and 24; slide gate 26; carousel slide tray 28; focusing knob 30, front projection selector button 32 and rear projection selector button 34. The operation of slide projector 10 in both front and rear projection modes will now be described.

When slide projector 10 is to be used for front projection, front projection selector button 32 is depressed, causing mirror 14 to be in front projection position 36, shown in dotted lines. One of ordinary skill in the art will understand how to make mirror 14 pivot in response to depression of buttons 32 and 34. In position 36, mirror 14 allows light rays 38 to pass through a slide 40 in slide gate 26 and reach lens 18 through gap 44. A lens tunnel, such as lens tunnels 42 and 43, indicate necessary length for a lens in that lens port to ensure that the gap between the lens and slide, such as gap 44, is within proper parameters. Lens 18 is a medium or long focal length lens suitable for front projection. Lens 18 is made such as to compensate for dispersion of light rays 38 in gap 44. If a shorter focal length lens, such as lens 19, were placed in lens port 16, gap 44 could be significantly larger than the focal length of the lens, resulting in a greater expansion of the light in the portion of lens tunnel 42 not occupied by a lens. The practical result of the increase in gap 44 is that lens 19 would have to be larger and include more elements to "pipe" the light through the area of lens tunnel 42. However, gap 44 poses no problem for current medium or long focal length lenses used for front projection. Slide 40 drops from slide tray 28 into slide gate 26 due to gravity. Slides in slide tray 28 are inserted into compartments (not shown) resembling spokes on a wheel. When slide 40 is in slide gate 26, light rays 38 pass through slide 40 creating an image, the image passes through gap 44 into lens 18 and out for front projection.

When slide projector 10 is to be used for rear projection, rear projection selector button 34 is depressed, causing mirror 14 to be in the position shown in FIG. 1. In this rear projection position, mirror 14 creates a 45 degree angle with respect to slide gate 26. In this position, mirror 14 diverts light rays 38 from lens 18 to lens 19. In addition, mirror 14 also serves to invert light rays 38 after passing through slide 40, serving to invert the projected image, eliminating the need to flip slides set up for front projection. Since lens 19 is much closer to slide 40 due to shallow lens tunnel 43, lens 19 can be of a simpler and cheaper design using fewer lens elements. In fact, lens 19 may be as simply designed as a conventional 35 mm camera lens.

Figure 2:
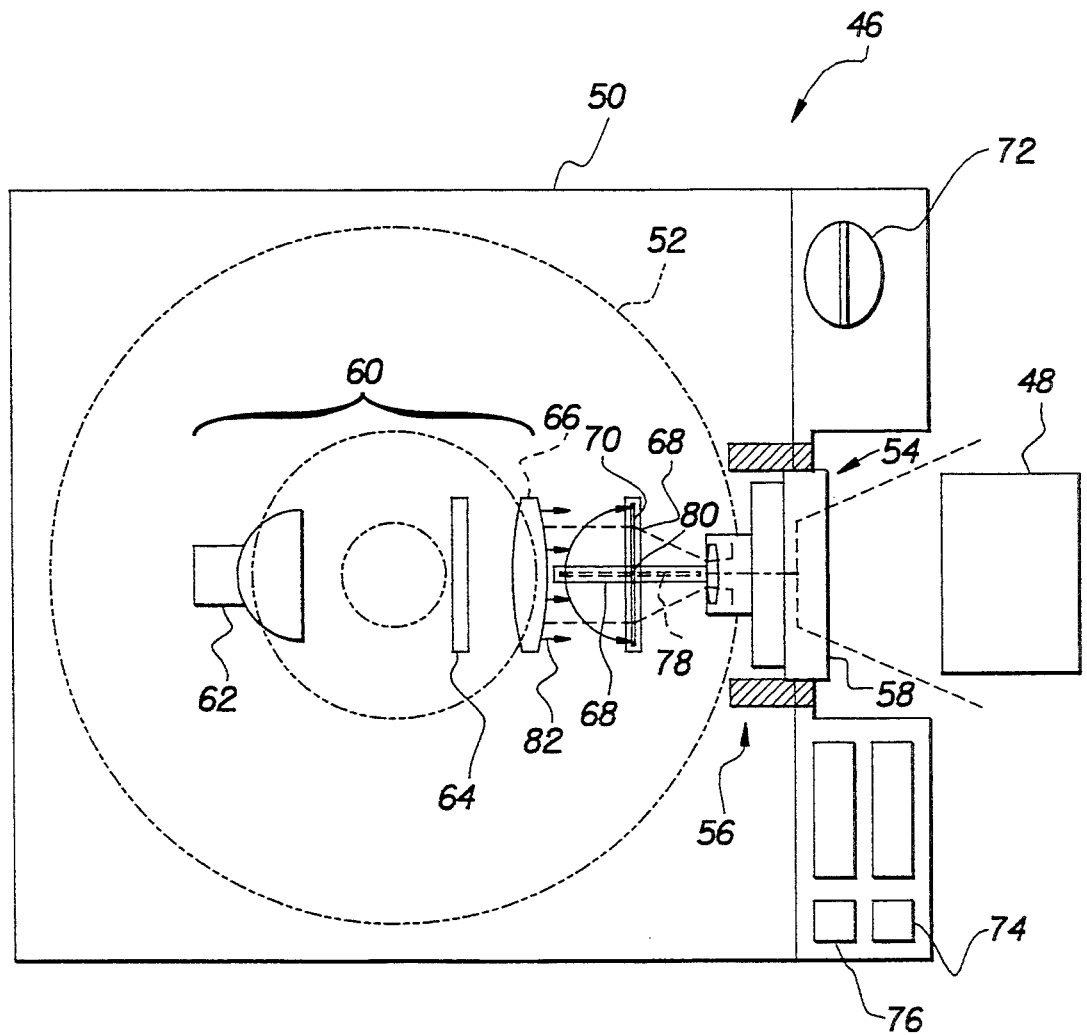
FIG. 2 is a top view of a slide projector and lens tunnel extender according to the second aspect of the present invention.

FIG. 2 is a top view of a slide projector 46 for both front and rear projection according to a second aspect of the present invention. Projector 46 presents a new design primarily intended for rear projection, but when used with front projection lens tunnel extender 48, may be used for front projection as well.

Slide projector 46 comprises housing 50; carousel slide tray 52; lens port 54 including lens tunnel 56 and having rear projection lens 58 therein; light source 60 including light 62 and light collector elements 64 and 66; slide gate 68 with slide 70 therein; focusing knob 72; front projection selector button 74 and rear projection selector button 76. The operation of slide projector 46 in both front and rear projection modes will now be described.

Regardless of operation in front or rear projection mode, a slide from slide tray 52 drops due to gravity into slide gate 68 in position 78 shown in dotted lines in FIG. 2. When used for front projection, front projection selector button 74 is initially depressed. In response to depression of button 74, slide gate 68 rotates either 90 degrees clockwise or counterclockwise, depending on the assumed initial orientation of slide 70, on vertical axis 80 to become perpendicular to light rays 82 coming out of element 66. One of ordinary skill in the art will understand how to achieve the movement of slide gate 68 in response to depression of button 74 (or button 76). Lens tunnel extension 48 allows use of a front projection lens of a longer focal length than lens tunnel 56, such as lens 18 in FIG. 1. The length of lens tunnel extension 48 will depend on the front projection lens used.

When used for rear projection, rear projection selector button 76 is initially depressed and simple rear projection lens 58 is placed in lens port 54. In rear projection mode, lens tunnel extension 48 is not used. Aside from slide gate 68 rotating 90 degrees from position 78 in the opposite direction as in front projection mode, the operation of slide projector 46 in rear projection mode is the same as that above for front projection.

In both aspects described above, the introduction of a shorter lens tunnel allows the use of a simple wide angle (short focal length) lens. Although lens tunnel extension 48 is needed in the second aspect for front projection, this addition is simple and far less costly than the extended rear projection lens necessary for use in conventional slide projectors due to the long lens tunnel. In the first aspect, a rotating mirror is used to either allow conventional front projection or to invert and direct the light rays from an illuminated slide to an additional rear projection lens. In the second aspect, a rotating slide gate accomplishes inversion and a single shorter lens tunnel and lens tunnel extension allows both front and rear projection.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

We claim:

1. A slide projector for front and rear projection, said slide projector including a light source for illuminating a slide for projection, said slide projector comprising:
    a rear projection lens port including a shallow lens tunnel for mounting a rear projection lens; and
    means for orienting and directing light rays from said illuminated slide to allow projection thereof from said rear projection lens, said orienting and directing means being internal to said slide projector and comprising means for orienting said slide, said slide orienting means comprising a slide gate capable of pivotal movement.

2. A slide projector for front and rear projection, said slide projector including a light source for illuminating a slide for projection, said slide projector comprising:
    a single lens port for mounting a lens therein, said lens being chosen from a group of at least two possible lenses of differing focal lengths, a first lens of said group being a front projection lens and a second lens of said group being a rear projection lens; and
    a slide gate between said light source and said lens port for positioning a slide for projection, said slide gate being capable of movement between a first position for front projection and a second position for rear projection.

3. The slide projector of claim 2 further comprising means for causing said movement of said slide gate.

4. The slide projector of claim 3 wherein said movement causing means comprises a switch.

5. The slide projector of claim 2, wherein said lens port includes a lens tunnel, said slide projector further comprising a lens tunnel extension for front projection.

6. The slide projector of claim 2, wherein said lens port includes a lens tunnel, wherein said slide gate accepts a slide in a position parallel to said lens tunnel and wherein said slide gate pivots to become perpendicular to said lens tunnel.

7. The slide projector of claim 5 wherein said slide gate pivots clockwise for front projection and counterclockwise for rear projection.

8. The slide projector of claim 5 wherein said slide gate pivots clockwise for rear projection and counterclockwise for front projection.

9. A slide projector for front and rear projection, said slide projector including a light source for illuminating a slide for projection and a slide tray for holding a plurality of slides, said slide projector comprising:

a lens port for mounting a lens, said lens port including a lens tunnel configured for a rear projection lens;

an adjustable slide gate below said slide tray and between said light source and said lens tunnel into which a slide from said slide tray drops, said adjustable slide gate being capable of pivoting between a first position for front projection and a second position for rear projection; and a lens tunnel extension for use with a front projection lens.

* * * * *